US009992580B2

(12) United States Patent
Cohen et al.

(10) Patent No.: US 9,992,580 B2
(45) Date of Patent: Jun. 5, 2018

(54) SIGNAL TO NOISE RATIO USING DECENTRALIZED DYNAMIC LASER MICROPHONES

(71) Applicant: Avaya Inc., Santa Clara, CA (US)

(72) Inventors: Azaria Cohen, Levona (IL); Tamar Barzuza, Tel Aviv (IL)

(73) Assignee: Avaya Inc., Santa Clara, CA (US)

( * ) Notice: Subject to any disclaimer, the term of this patent is extended or adjusted under 35 U.S.C. 154(b) by 131 days.

(21) Appl. No.: 15/061,720

(22) Filed: Mar. 4, 2016

(65) Prior Publication Data

US 2017/0257709 A1    Sep. 7, 2017

(51) Int. Cl.
| | |
|---|---|
| *H04R 3/00* | (2006.01) |
| *H04R 23/00* | (2006.01) |
| *H04R 29/00* | (2006.01) |
| *G06F 3/01* | (2006.01) |
| *H04N 7/15* | (2006.01) |

(52) U.S. Cl.
CPC ........... *H04R 23/008* (2013.01); *G06F 3/012* (2013.01); *G06F 3/013* (2013.01); *H04N 7/15* (2013.01); *H04R 29/004* (2013.01)

(58) Field of Classification Search
CPC .... H04R 3/005; H04R 23/002; H04R 23/008; H04R 29/004; H04R 29/005; H04R 2201/401; H04R 2201/403; H04N 7/15; H04N 7/152; G06F 3/012; G06F 3/013; G06F 3/015

USPC ..... 381/91, 92, 122, 95, 111–115; 348/14.09
See application file for complete search history.

(56) References Cited

U.S. PATENT DOCUMENTS

| | | | | |
|---|---|---|---|---|
| 7,130,705 | B2* | 10/2006 | Amir | H04R 3/00 381/107 |
| 7,646,876 | B2* | 1/2010 | Chu | H04N 7/142 348/14.01 |
| 8,526,626 | B2* | 9/2013 | Nielsen | H04H 60/32 381/58 |
| 9,544,679 | B2* | 1/2017 | Trestain | H04R 1/323 |
| 2005/0008169 | A1* | 1/2005 | Muren | H04N 7/15 381/92 |
| 2014/0362253 | A1 | 12/2014 | Kim et al. | |
| 2017/0133036 | A1* | 5/2017 | Cohen | H04R 3/005 |

* cited by examiner

*Primary Examiner* — Xu Mei
(74) *Attorney, Agent, or Firm* — Sheridan Ross P.C.

(57) ABSTRACT

A communication system includes a processor and a computer readable medium, coupled with the processor, comprising instructions that program the processor to: cause an electromagnetic emitter to irradiate a location on a selected object in proximity to a speaker; determine, from radiation reflected by the selected object at the irradiated location, an audio characteristic of the irradiated location; and when the audio characteristic is acceptable, assigning an electromagnetic microphone to collect audio information from radiation reflected by the selected object at the irradiated location.

21 Claims, 8 Drawing Sheets

SIGNAL TO NOISE RATIO USING DECENTRALIZED DYNAMIC LASER MICROPHONES

FIELD

The disclosure relates generally to video communication and particularly to capturing audio information in video telecommunication.

BACKGROUND

Video conferencing uses microphone arrays to reduce the adverse impact of noised and reverberations and improve the speech intelligibility and listener comfort of captured audio. Audio enhancement algorithms self-calibrate by processing acquired microphone signals and enable greater flexibility in microphone array geometry.

More flexible microphone array geometries enables video conferencing systems to use a local microphone cluster in the proximity of the sound source. Dynamic clustering is beneficial because it is possible to have a small number of microphones, closer to the sound source and thereby realize a higher signal-to-noise ratio ("SNR") when compared to remote microphone arrays. The use of different sound source locations resulting from different microphone clusters and therefore a large number of microphones installed throughout a defined area can be costly and complex to install.

SUMMARY

These and other needs are addressed by the various embodiments and configurations of the present disclosure. The present disclosure can provide a microphone solution that uses reflection of electromagnetic energy, particularly light, to determine where to locate microphones that detect surface vibrations caused by sound waves emitted by participants in a conference call, particularly a video conference call.

The disclosure describes a communication system that can include:

a processor;

multiple electromagnetic microphones, with each electromagnetic microphone including a radiation emitter and a radiation detector;

a media input to collect video of participants to a communication session during the communication session; and a computer readable medium coupled with the processor and including instructions.

The instructions program the processor to:

cause an electromagnetic emitter to irradiate a location on a selected object in proximity to a speaker;

determine, from radiation reflected by the object at the irradiated location, an audio characteristic of the irradiated location; and when the audio characteristic is acceptable, assigning an electromagnetic microphone to collect audio information from radiation output by the electromagnetic microphone and reflected by the object at the irradiated location.

The disclosure also describes a video conferencing system that can include:

a processor;

a media input, coupled to the processor, to collect image information of one or more local participants to a communication session;

a media output, coupled to the processor, to provide, in a selected layout, image information of one or more remote participants to the communication session;

an audio output, coupled to the processor, to provide audio information from the one or more remote participants; and an audio input, coupled to the processor, to collect audio information from the one or more local participants.

The audio input can include an array of electromagnetic microphones, each electromagnetic microphone including an electromagnetic emitter to irradiate a location on a selected object in proximity to the one or more local participants and a detector to collect radiation reflected by the selected object at the irradiated location.

The processor can determine the audio information from the reflected radiation collected by each electromagnetic microphone in the array.

The processor can cause multiple locations to be irradiated, determine a respective audio characteristic for each of the irradiated locations, compare the determined respective audio characteristics with one another, and assign the electromagnetic microphone to the location having the superior respective audio characteristic for collection of audio information.

The processor can select the location to be irradiated for audio information collection based on one or more of lip movement of a participant and gaze direction of a participant.

The processor can determine, during irradiation of the location, whether a line-of-sight between the electromagnetic emitter and the location is at least partially blocked and, when the line-of-sight is at least partially blocked, select a different location for irradiation having line-of-sight with the electromagnetic emitter.

The selected object can be one or more of a wall, mirror, window, screen, picture, item of furniture, ceiling, vase, drinking utensil, window cover, or floor.

The radiation can be light within or outside of the visible spectrum or microwave radiation.

The electromagnetic emitter can be part of the electromagnetic microphone. The electromagnetic microphone can be directed to the location by the processor controlling its pan and tilt to determine the audio characteristic of the location or collect audio information. The audio characteristic can be a signal-to-noise ratio of a signal output by the detector describing a sound pressure wave contacting the irradiated location The electromagnetic emitter can be separate from the electromagnetic emitter in the electromagnetic microphone and can have the same or different wavelength as a wavelength of the radiation output by the electromagnetic microphone. The audio characteristic can be an irradiated spot size or radiation intensity at the location.

The present disclosure can provide a number of advantages depending on the particular configuration. The systems and methods can use an ad hoc collection of objects to create electromagnetic ("EM") microphones organized in one or more arrays in the vicinity of the sound source, thereby providing a low-cost, highly effective, and dynamically configurable microphone array. The EM microphones can measure light reflections related to audio emissions mediated by surface vibrations. The EM microphones can use laser beams, which can be pulse and have low energy emissions. Pulsed, low energy laser beams can be safe for participants. The ability to select random objects for irradiation and audio detection and collection can enable the system to obtain substantially optimal audio signals for processing by an enhancement algorithm. Selectively determining the best locations in relation to spot vibration instead of simply locating a large number of regular microphones throughout a monitored area can provide an elegant and cost-effective microphone deployment solution that improves significantly SNR.

These and other advantages will be apparent from the disclosure contained herein.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "biometric information" is any information that can be used in biometric verification to identify uniquely a selected person, including one or more distinguishing biological traits. Unique identifiers include, for example, fingerprints, hand geometry, earlobe geometry, retina and iris patterns, voice waves, DNA, and signatures.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A "computer readable storage medium" may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A "computer readable signal medium" may include a propagated data signal with computer readable program code embodied therein, for example, in baseband or as part of a carrier wave. Such a propagated signal may take any of a variety of forms, including, but not limited to, electromagnetic, optical, or any suitable combination thereof.

A "computer readable signal medium" may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine", "calculate" and "compute," and variations thereof, as used herein, are used interchangeably and include any type of methodology, process, mathematical operation or technique.

The term "electronic address" refers to any contactable address, including a telephone number, instant message handle, e-mail address, Universal Resource Locator ("URL"), Universal Resource Identifier ("URI"), Address of Record ("AOR"), electronic alias in a database, like addresses, and combinations thereof.

The term "electromagnetic energy" ("EM radiation" or "EMR") refers to the radiant energy released by certain electromagnetic processes. Visible is an example of electromagnetic radiation. Other examples include radio waves, invisible light (such as infrared light), microwaves, and X rays. For purposes of this disclosure, EMR does not include infrasound (sound of frequency below 20 Hz), audible sound (sound of frequency of from 20 to 20,000 Hz), or ultrasound (sound of frequency of greater than 20 kHz).

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "multipoint" conferencing unit refers to a device commonly used to bridge videoconferencing connections. The multipoint control unit can be an endpoint on a network that provides the capability for three or more endpoints and/or gateways to participate in a multipoint conference. The MCU includes a mandatory multipoint controller (MC) and optional multipoint processors (MPs).

The term "transfer function" (also known as the system function or network function), when plotted as a graph, or transfer curve, is a mathematical representation for fit or to describe inputs and outputs of black box models. Typically it is a representation in terms of spatial or temporal frequency, of the relation between the input and output of a linear time-invariant system (LTI) with zero initial conditions and zero-point equilibrium. With optical imaging devices, for example, it is the Fourier transform of the point spread function (hence a function of spatial frequency), i.e., the intensity distribution caused by a point object in the field of view.

The term "video" refers to any relevant digital visual sensory data or information, including utilizing captured still scenes, moving scenes, animated scenes etc., from multimedia, streaming media, interactive or still images etc.

The term "videoconferencing" refers to conduct of a videoconference (also known as a video conference or videoteleconference) by a set of telecommunication technologies which allow two or more locations to communicate by simultaneous two-way video and audio transmissions. It has also been called 'visual collaboration' and is a type of groupware. Videoconferencing differs from videophone calls in that it's designed to serve a conference or multiple locations rather than individuals.

The term "visible spectrum" refers to the portion of the electromagnetic spectrum that is visible to the human eye. Electromagnetic radiation in this range of wavelengths is called visible light or simply light. A typical human eye will respond to wavelengths from about 390 to 700 nm. In terms of frequency, this corresponds to a band in the vicinity of 430-770 THz. EMR having longer wavelengths than 700 nanometers, such as infrared light (which has a wavelength of greater than 700 nanometers to 1 mm (300 GHz)) is generally not visible to the human eye.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

DETAILED DESCRIPTION

Figure 1:
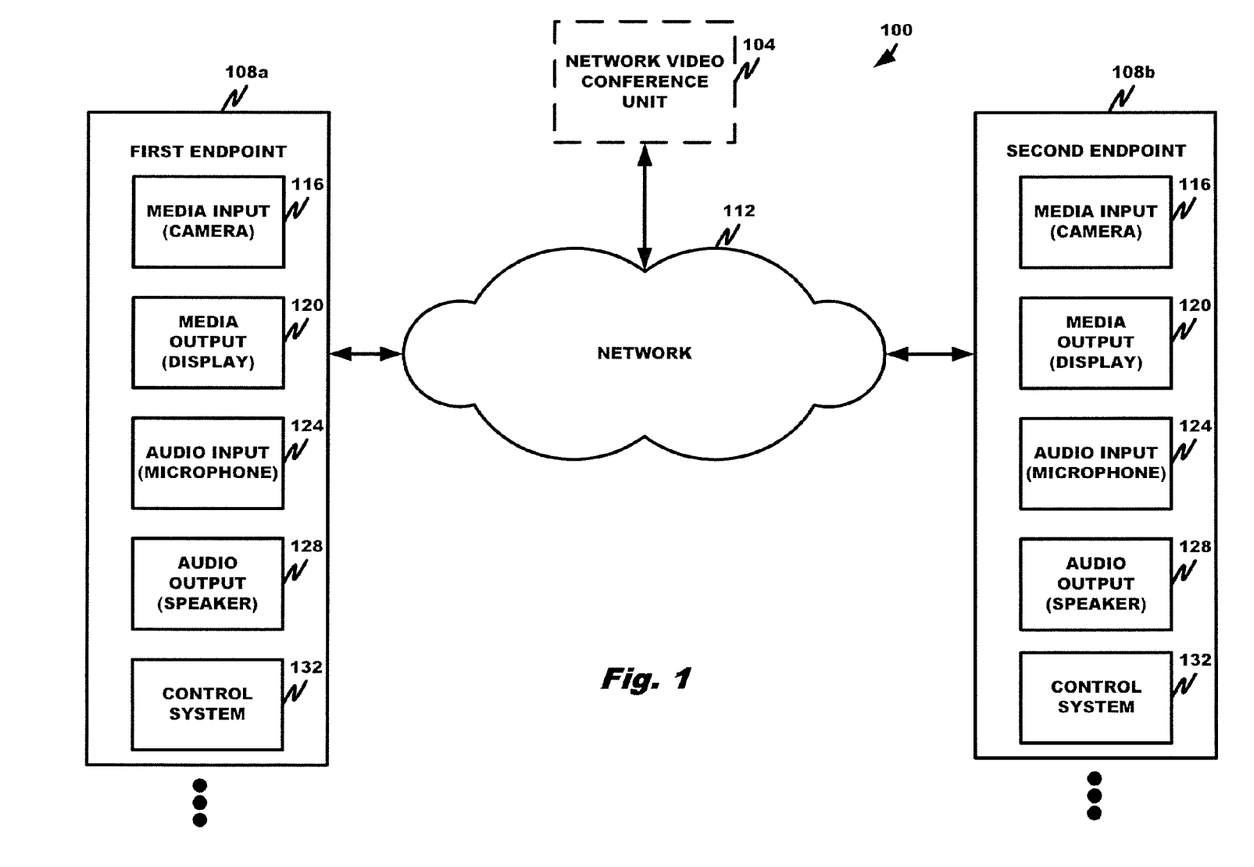
FIG. 1 is a block diagram depicting a video conferencing system configuration according to an embodiment of the disclosure.

The conferencing system 100 of FIG. 1 can include an optional network video conference unit 104 and at least first and second endpoints 108a,b, interconnected by a network 112. While the first and second endpoints 108a,b are depicted, it is to be appreciated that more endpoints can be present and participating in the video conference. The conferencing system 100 can be a personal video conferencing system between two users communicating one-on-one or point-to-point, a group video conferencing system among three or more people, a mobile video conferencing system involving one or more mobile endpoints and can be a software only solution, hardware only solution, or combination of software and hardware solutions.

The optional network video conference unit 104 can be any network multipoint conferencing unit ("MCU") or video conferencing server ("VCS"). During a multipoint conference session, the MCU can manage multiple endpoints at once, coordinate the video data processing of the multiple endpoints, and forward the flow of media streams among the multiple endpoints. The MCU can conduct group video conferences under the principle of mixing media streams, i.e. mixing and re-encoding participants' video conferencing streams in real time. For example, the MCU can create a picture-in-picture effect. The MCU can include a multipoint controller ("MC") and optionally one or more multipoint processors ("MPs"). The MCs can coordinate media stream processing parameters between endpoints and typically support the H.245 protocol. The MPs can process, mix and switch multimedia streams.

In contrast, a VCS often implements a multiplexing pattern of the data streams, which implies no transcoding. The VCS typically redirects the media streams of the video conference participants. The compression/decompression and media stream mixing functions can be performed in the endpoint devices.

The network video conference unit 104 can service any conference topology, including a centralized conference, decentralized conference, or hybrid conference topology. Exemplary video conference units that can be modified as set forth herein include the ELITE 6000™, 6110™, 6120™, 5000™, 5105™, and 5110™ products of Avaya, Inc.

The first and second endpoints 108a, 108b, . . . can be any suitable devices for providing a user interface for a voice or video conference. Some of the endpoints can be capable of hosting the voice portion of the conference only or a part of the video conference (e.g., only display images of remote participants but not transmit an image of a local participant or only transmit an image of a local participant but not display images of remote participants) or all of the video conference (e.g., display images of remote participants and transmit an image of the local participant). The first and second endpoints typically at least capture and optionally display locally to the local participant images of local participants. Examples of suitable devices include a cellular phone, tablet computer, phablet, laptop, personal computer, and purpose-built devices, such as the SCOPIA XT EXECUTIVE 240™, XT ENDPOINT™, XT1700™, XT4200™, XT4300™, XT5000™, XT embedded Server™, and XT Endpoint™ with embedded server products by Avaya, Inc. that can be modified as set forth herein.

The optional network video conference unit 104 and first and second endpoints 108a and 108b are generally connected by the network 112. The network 112 can be a local area network ("LAN"), a wide area network ("WAN"), a wireless network, a cable network, a telephone network, the Internet, and/or various other suitable networks in which a video conferencing system can be implemented.

Each of the first and second endpoints 108a,b can include a media input 116, such as one or more cameras to collect image information of one or more local participants to a communication session (or participants located at the selected endpoint), a media output 120 to provide, in a selected layout, image information of one or more remote participants to the communication session (or participants located at the other endpoint), such as one or more displays, an audio input 124 to collect audio information from the one or more local participants, such as one or more microphones, an audio output 128 to provide audio information from the one or more remote participants, such as one or more speakers, and a control system 132 to select and analyze possible locations for microphones and, for each of the selected locations, assign and enable a microphone 276.

The microphones in the audio input 124 are generally electromagnetic or EM microphones that detect, through reflected electromagnetic radiation, vibrations in a selected object, such as a window pane, screen, glass of water, flower vase, box, wall, picture or mirror hung on the wall, table, participant clothing, or even the participant himself or herself induced by sound waves generated during the conference. Objects in the vicinity of the speaker can thus be used as the sound acquisition layer of a microphone array.

In one example, the electromagnetic microphones can include one or more laser microphones. Laser microphones use a laser beam to detect sound vibrations in a distant object. The object is typically inside a room where a conversation is occurring and can be anything that vibrates in response to the pressure waves created by noises present in the room. The object commonly has a smooth surface. The laser beam is directed onto the selected object, reflects off the object, and returns to an electro optical or photo detector that uses an appropriate transfer function to convert the beam into an audio signal.

Figure 3A:
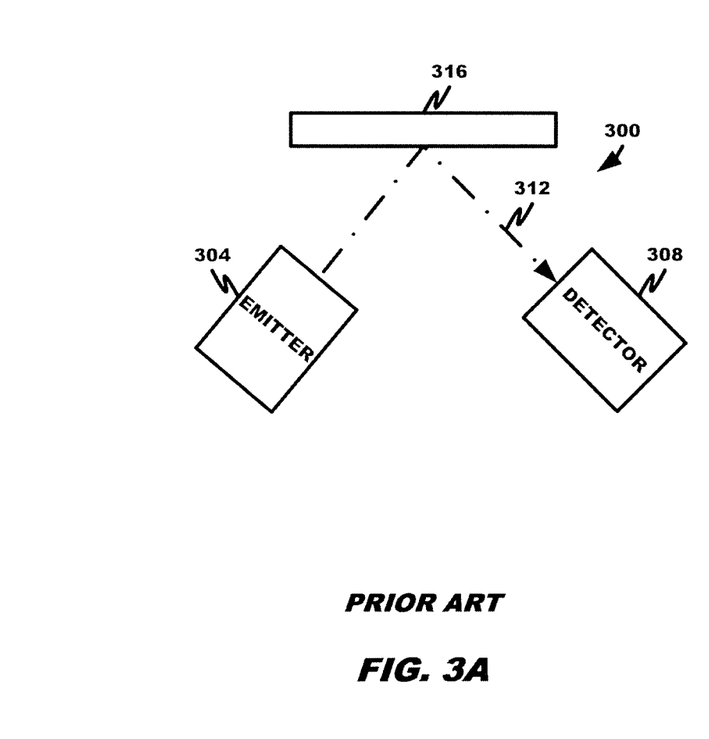
FIGS. 3A-B are block diagrams depicting various EM microphone configurations.
Figure 3B:
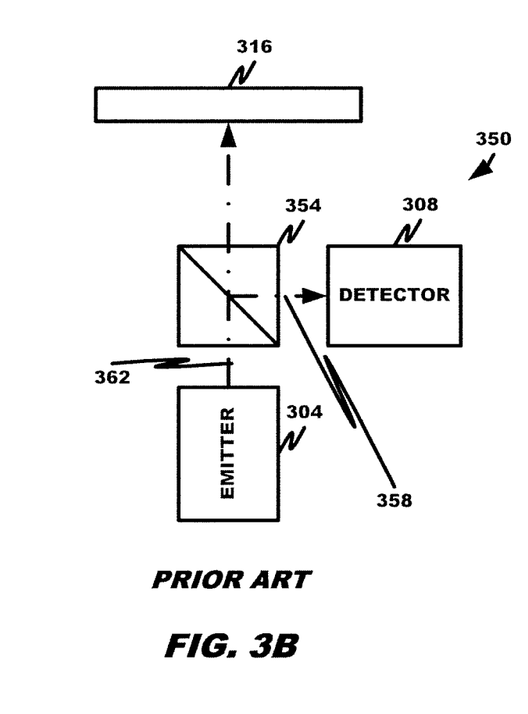

Examples of EM microphones are shown in FIGS. 3A and 3B. With reference to FIG. 3A, the EM microphone 300 includes an EM emitter 304, such as a light source or laser, and a detector 308, such as an electro optical or photo detector or CCD array, that converts the beam into an audio signal. As will be appreciated, the laser includes a laser diode selected to produce a selected wavelength of radiation and a collection of lenses, such as one or more collimating lenses, beam expansion lenses, objective lenses, and combinations thereof while the detector typically includes one or more bandpass filters to pass radiation having the wavelength selected for the laser and a photo detector. The EM beam 312 emitted by the emitter 304 reflects off the selected object 316 and is captured by the detector 308. When sound hits a windowpane, for instance the window pane commonly bends and causes the laser beam to bend. With reference to FIG. 3B, the EM microphone 350 differs from the EM microphone 300 by using a beam splitter 354 to direct the reflected EM beam 358 to the detector 308 while passing, without redirection, the emitted EM beam 362 to contact the selected object 316. In both examples, the minute differences in the distance traveled by the beam 308 as it reflects from the vibrating selected object 316 can be detected interferometrically. The interferometer converts the variations to intensity variations, and electronics can be used to convert these variations to signals that can be converted back to sound.

While the discussion emphasizes laser microphones, it is to be understood that the concepts of the disclosure can apply to other types of EM microphones, such as EM microphones using light outside the visible spectrum or microwaves and EM microphones using other types of electromagnetic energy sources, such as light emitting diodes ("LEDs").

Figure 7:
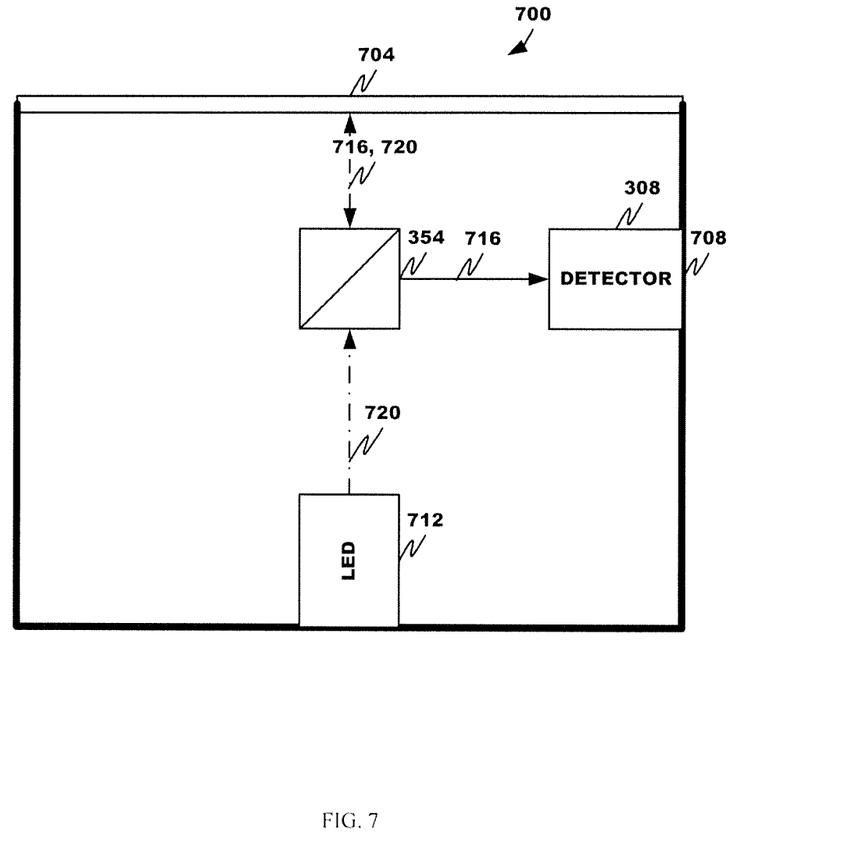
FIG. 7 is a diagram depicting an electromagnetic microphone according to an embodiment.

Another example of an electromagnetic microphone is shown in FIG. 7. The microphone 700 includes an elastic surface 704 to vibrate in response to sound pressure waves and housing 708. The housing 708 includes an LED 712 to emit light and a beam splitter 354 to direct the reflected light beam 716 to the detector 308 while passing, without redirection, the emitted EM beam 720 to contact the selected object 316. These microphones 700 can be located at selected locations around the monitored area and turned on and off as desired to create an ad hoc microphone array as discussed herein.

Typically, the electromagnetic microphones are configured in an array, the configuration of which typically changes during the communication session or conference call. In other words, at a first time during the session, the electromagnetic microphones collect audio information at a first set of electromagnetic microphone monitored locations and, at a second time during the session, the electromagnetic microphones collect audio information at a second set of electromagnetic microphone monitored locations. The first set of electromagnetic microphone monitored locations has at least one member different from the second set of electromagnetic microphone monitored locations. The change in monitored locations over time can be in response to many stimuli, including change in speaker position, change in speaker identity, reduction in the signal-to-noise ratio of the collected audio information, and the like.

The use of an array of electromagnetic microphones can provide substantially enhanced signal-to-noise ratios for the collected audio information. Microphone array beamforming can extract desired speech signals in an interference-dominant, noisy environment. Such operations can be useful to enhance speech signal quality for perception or further processing. Beamforming is typically performed by defining a uniform linear array associated with the electromagnetic microphones, processing the received signals with a time delay or frost beamformer (which compensates for the arrival time differences across the microphone array for a signal coming from a specific direction), and using diagonal loading to improve robustness of the beamformer. In beamforming, the time aligned multichannel signals are coherently averaged to improve the signal-to-noise ratio (SNR). By attaching FIR filters to each sensor, the Frost beamformer has more beamforming weights to suppress the interference. It is an adaptive algorithm that places nulls at learned interference directions to better suppress the interference. In diagonal loading, the array is steered in the direction of a second speech signal. In the steering direction, the Frost beamformer uses distortionless constraints to ensure desired signals are not suppressed. After defining a steering angle corresponding to the incident direction of the first speech signal, a time delay beamformer is constructed. The microphone array can use a predetermined or fixed listening direction or variable listening direction, based for example on automatic location the active talker and electronic steering of a listening beam in that direction.

Figure 2:
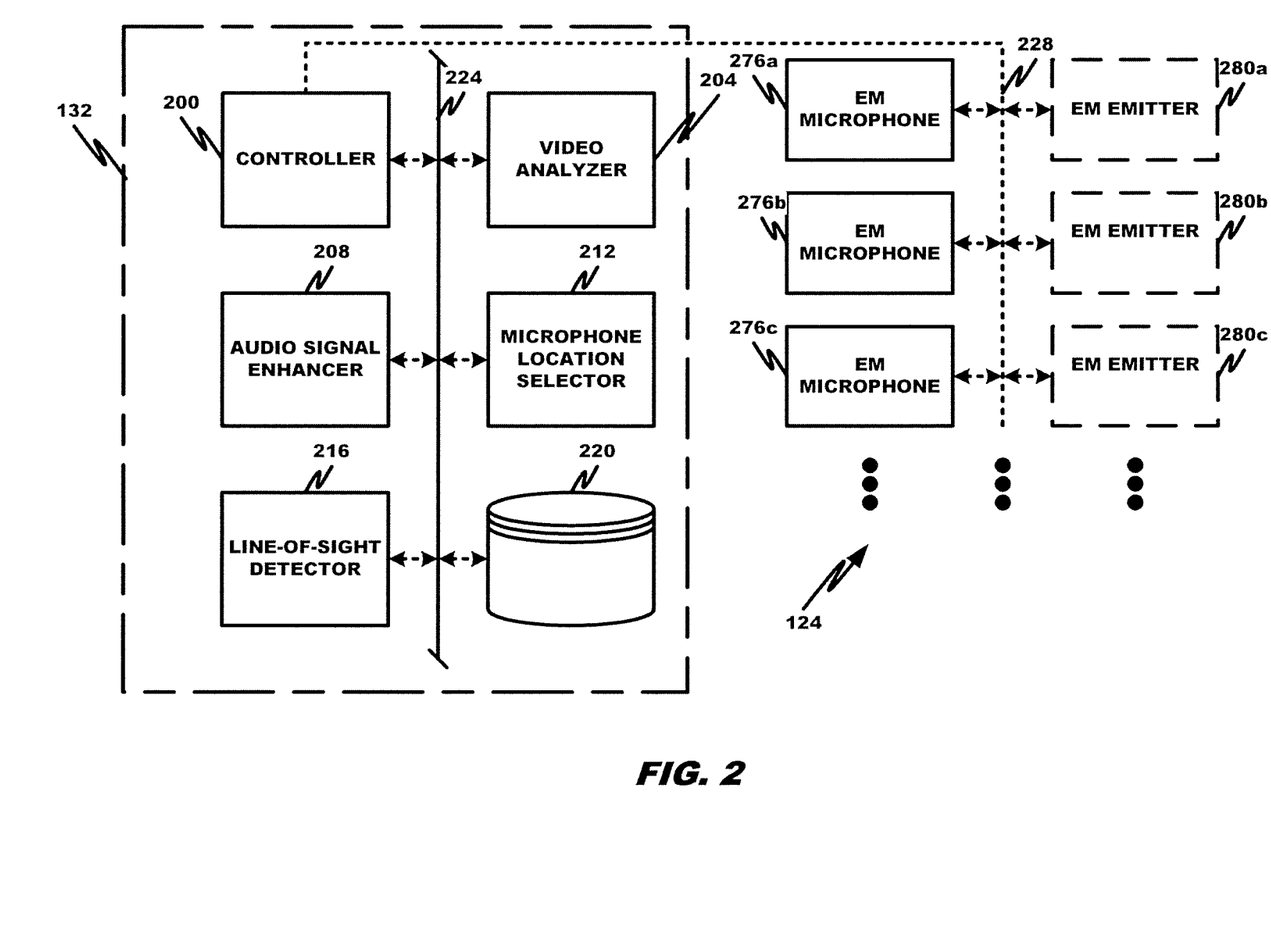
FIG. 2 is a block diagram depicting a control system configuration according to an embodiment of the disclosure.

The control system 132 is depicted in greater detail in FIG. 2. The control system 132 controls not only operation of EM microphones to collect audio information during the video conference but also selection of optimal or near optimal locations having line-of-sight to corresponding EM microphones for EM microphone audio collection before and during the conference call. The location selection process, also referred to as audio characterization of possible EM microphone locations, bases location selection largely on locations providing a high signal-to-noise ratio ("SNR") for the EM microphone-captured audio information. The use of multiple EM microphone locations, that can remain fixed or vary dynamically during the call as sound sources change or move in the monitored area, can manage the noise component of the SNR by capturing different sources of sound from the environment using radiation, particularly light, coupled with intelligent location of EM microphones relative to the sound sources for optimization of audio collection.

In one configuration, the control system 132 includes a microphone location selector 212, audio signal enhancer 208, a video analyzer 204, a line-of-sight detector 216, a database 220, and a controller 200, connected by network 224.

The microphone location selector 212 selects sets of possible locations for EM microphones and compares stored audio characterization information for each possible location in each set of possible locations in a database 220 to determine an optimal set of possible locations to use for locating microphones.

The audio signal enhancer 208 improves speech quality using one or more enhancement algorithms. Enhancement improves intelligibility and/or overall perceptual quality of degraded speech signals using audio signal processing techniques. Examples of algorithms used for enhancement include filtering techniques, such as the spectral enhancement method, Wiener filtering, and the signal subspace approach, spectral resolution techniques, such as minimum mean-square-error short-time spectral amplitude estimator, and speech-model-based techniques.

The video analyzer 204 analyzes the video stream for visual clues as to speaker identity and/or participant focal point, such as a presentation or whiteboard. The video analyzer 204, for instance, can use a face detection algorithm, such as the Viola-Jones or KLT detection algorithm, to identify the face of each participant, a tracking algorithm, such as a histogram-based tracker or CAMShift algorithm, to track movement of a selected facial feature, such as a speaker's lips, by tracking a selected shape, texture, or color of the facial feature, audio tracking to track transitions or changes between sound sources or speakers, and gaze detection or eye tracking to track the eye movement of one or more selected participants. Eye trackers measure rotations of the eye generally by optical tracking of eye movement without direct contact to the eye. Light, typically infrared, is reflected from the eye and sensed by a video camera or some other specially designed optical sensor. The information is then analyzed to extract eye rotation from changes in reflections. Video-based eye trackers typically use the corneal reflection (the first Purkinje image) and the center of the pupil as features to track over time.

The line-of-sight detector 216 determines if a line-of-sight between an EM microphone 276 or EM emitter 280 and a corresponding assigned possible or selected EM microphone location is fully or partially blocked by an object while the EM reflected off of the location is being monitored. Such partial or full blockage can render the collected EM reflectance information unreliable. The line-of-sight detector 216 can, for example, be a software module, such as a detection algorithm, that analyzes captured video information regarding the area for or during the conference call to identify blockages in the line-of-sight between each EM microphone 276 or EM emitter 280 and corresponding assigned possible or selected EM microphone location.

The database 220 can be any data model, including relational, entity-relational, object oriented, NoSQL, NewSQL, and the like. A database management system (DBMS) interacts with users, other applications, and the database itself to capture and analyze data. The stored data includes data structures comprising each conference call participant, including identity, contact information, biometric information, and electronic calendar information, conference call configuration information, including topology, user preferences, display layout at each node, participating endpoint electronic addresses, network video conference unit electronic address, buffered or stored captured video and sensed audio information from each endpoint of the conference call, pan and tilt for each EM microphone and/or EM emitter to irradiate a selected location, display parameters for each endpoint, quality and bandwidth settings, firewall information (such as H.323 port usage information and security settings), and the like.

The controller 200 initiates the operations of the other components upon commencement of the video conference call, controls the operations of the other components during the call, assigns EM microphones 276 and/or EM emitters 280 to each location in the selected set of locations, causes the adjustment of the pan and tilt of each assigned EM microphone 276 and/or EM emitter 280 to irradiate the assigned location with EM energy, and ends the operations of the other components upon conclusion of the video conference call by detecting hang up and issuing appropriate commands.

The control system 132 controls, by signal lines 228 and/or wireless signals, the EM microphones 276a-c . . . and (optional) EM emitters 280a-c, . . . . As an optional part of the characterization process, the EM emitters 280 irradiate each possible EM microphone location with EM energy to enable audio characterization of each possible EM microphone location. An example of an EM emitter 280 is a laser beam projector or other directional EM emitter that produces laser radiation outside the visible spectrum. For each spot at each possible location, the spot size and/or density are monitored as a function of time to determine the amplitude of vibrations in the object caused by the sound pressure wave. The spot size and/or density (or intensity) are determined by capturing sequenced time stamped images by a general purpose camera (not shown) or sequenced frames captured by a video recorder (not shown) and using an image processing module (not shown) in the video analyzer 204 to analyze the image information for the spot size and density. This yields, for each spot, a time varying sequence of spot sizes and/or densities. As will be appreciated, the spot size and density for each spot change as a function of time in response to sound induced pressure waves contacting and vibrating the illuminated surface. The magnitude of the difference over time in the spot size and/or density correlates, or is directly proportional, to the magnitude of the vibrations in the object and therefore the magnitude of the acoustic signal pressure wave contacting the object at that location.

The operation of the control system 132 will be described with reference to FIGS. 5A-B.

Figure 5A:
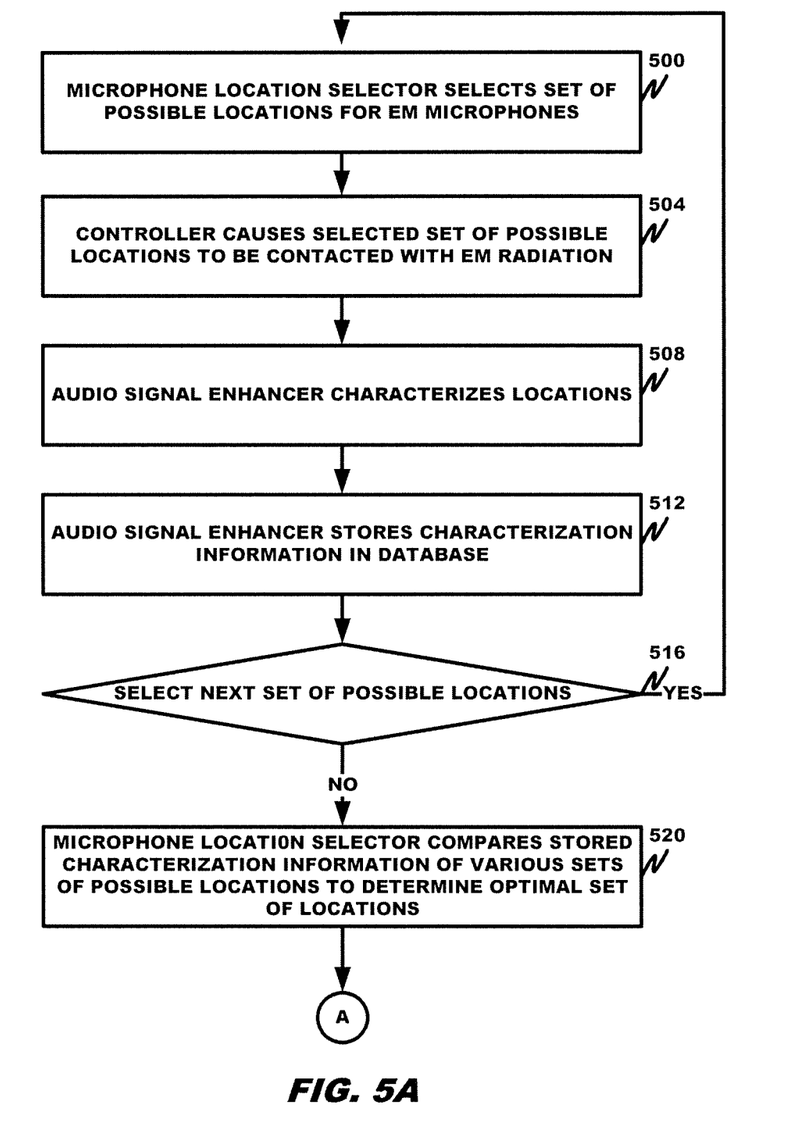
FIGS. 5A-5B are flow charts depicting logic according to an embodiment.
Figure 5B:
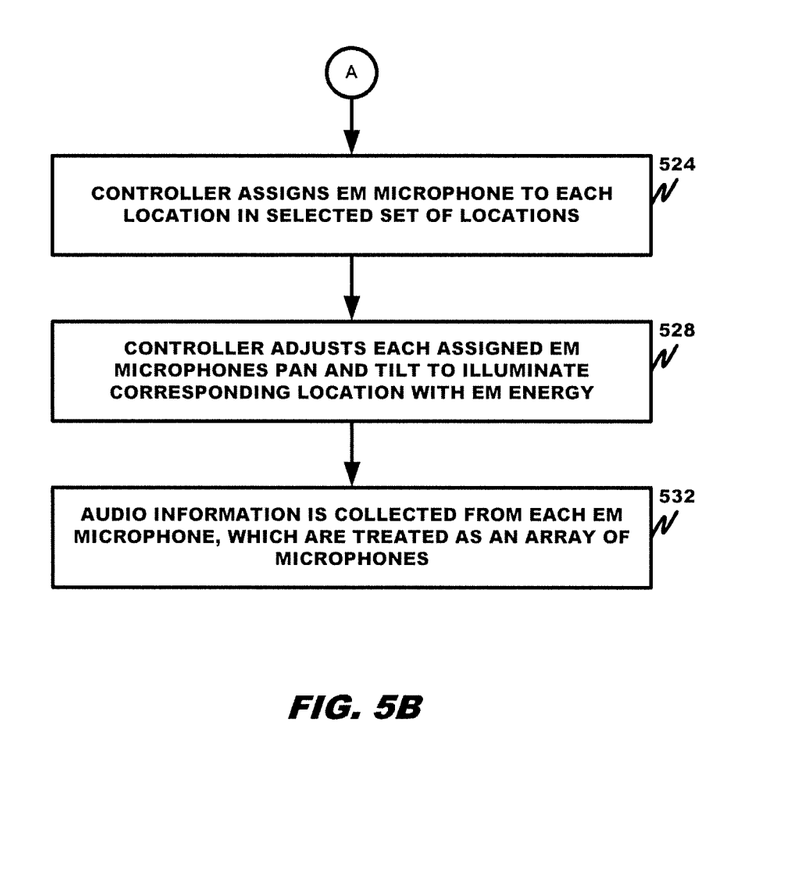

Referring to FIG. 5A, the microphone location selector, in step 500, selects a set of possible locations for EM microphones. The possible locations can be selected based on locations selected for prior video conference calls conducted in the same area, in accordance with administrator defined rules (such as types of objects to be used as sound reflecting surfaces, proximity to each participant in the area, number and locations of participants, and the like), location selections made by a user, and the like. In one application, the video analyzer 204 provides recommended locations to the microphone location selector by analyzing the captured video for clues. The clues include detection of which participant is speaking by detecting lip movement, gaze detection of one or more participants, seating locations of participants, and the like. Multiple sets of possible locations or an excess number of possible locations can be selected to enable selection of a smaller set of optimal locations.

Figure 4:
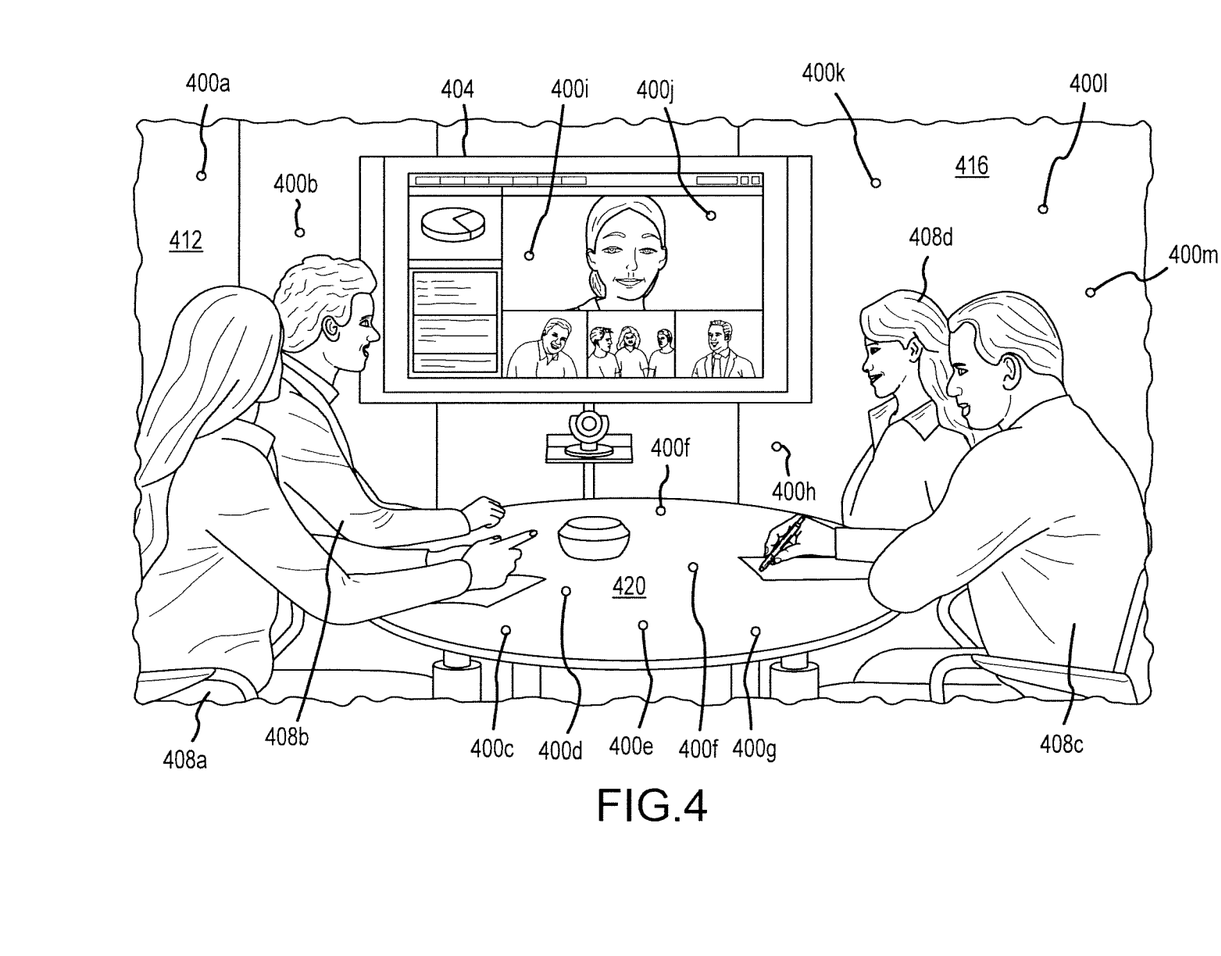
FIG. 4 depicts an example of irradiating plural EM microphone locations during location selection according to an embodiment.

The controller, in step 504, causes the selected set of possible locations to be contacted with EM radiation to commence audio characterization of each location. The EM radiation may be from an EM microphone 276 or an EM emitter 280. An example of the outcome of this step is shown in FIG. 4. As can be seen in FIG. 4, plural EMR illuminated spots 400a-m are shown at various spatial locations around the display 404 of the endpoint and the participants 408a-d. The spots are located on smooth surfaces, such as walls 412, windows 416, and table 420.

The audio signal enhancer, in step 508, characterizes the audio information that can be collected at each of the locations. This can be done in one of several ways. The locations can be scanned using one or more EM microphones to determine a signal-to-noise ratio for each location. An EM emitter can illuminate the locations as noted above to determine, for each location, a corresponding time varying sequence in spot size and density. A gross analysis of the sequence can indicate the vibrations measured, which correspond to the magnitude of the sound pressure waves striking the surface.

In step 512, the collected audio characterization information is stored in the database for each location, which is assigned a unique identifier.

In decision diamond 516, the controller determines whether there is a next set of possible locations. If so, the controller returns to step 500. If not, the controller proceeds to step 520.

In step 520, the microphone location selector compares stored audio characterization information for the various sets of possible locations to determine an optimal set of locations. This is usually the set of locations having the highest signal-to-noise ratios or most pronounced time varying sequences of spot size and density.

In step 524, the controller assigns an EM microphone to each location in the selected set of locations and, in step 528, adjusts the pan and tilt of each assigned EM microphone to illuminate a corresponding location with EM energy.

In step 532, the audio information is collected from each EM microphone, the collection of which is treated as an array of microphones. After assigning an EM microphone to each location, other locations can be exchanged or substituted as an assigned location and the tests above repeated during the conference call to determine whether the microphone array audio performance is improved.

The above steps can be performed once at the beginning of a video conference call, during the call as participant speakers change, or a combination of the above.

Figure 6:
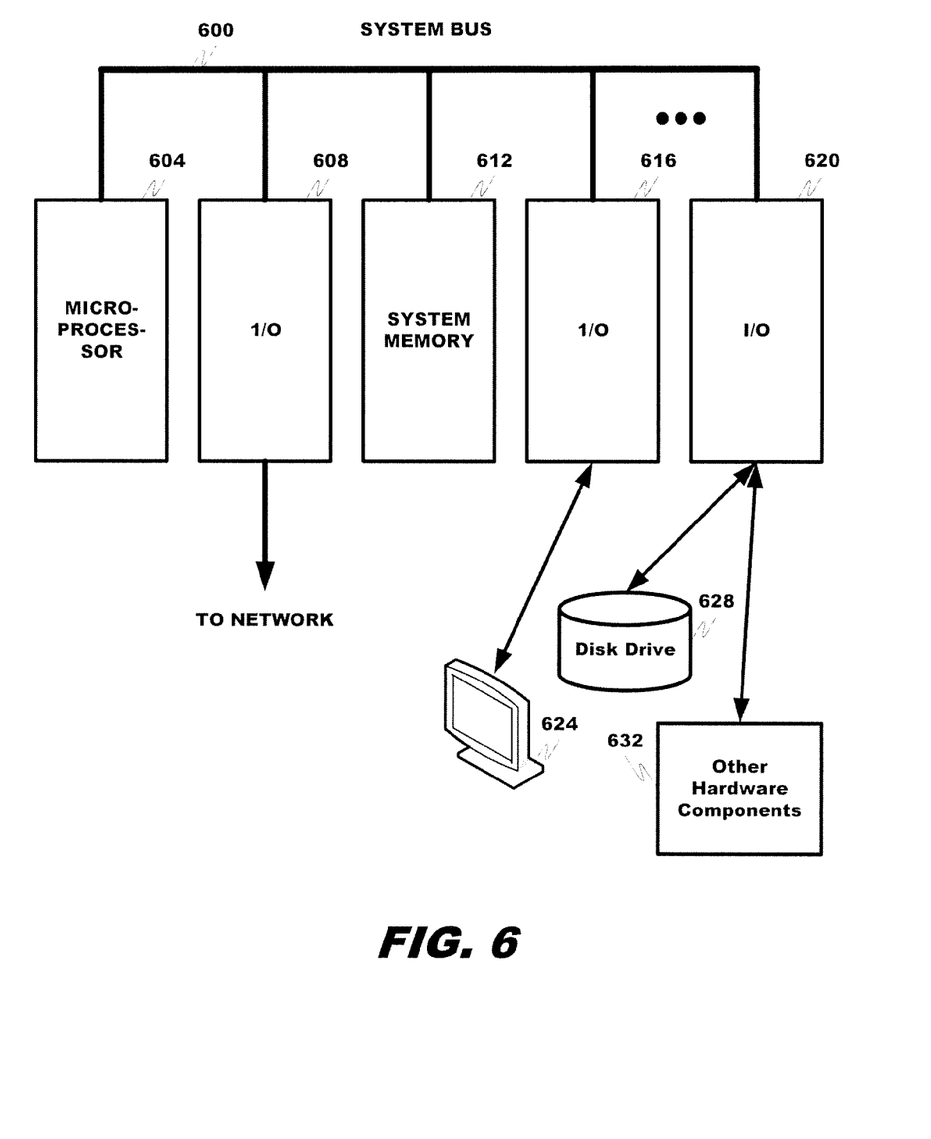
FIG. 6 is a block diagram depicting a system configuration according to an embodiment of the disclosure.

The subject matter of the disclosure can be implemented through a computer program operating on a programmable computer system or instruction execution system such as a personal computer or workstation, or other microprocessor-based platform. FIG. 6 illustrates details of a computer system that is implementing the teachings of this disclosure. System bus 600 interconnects the major hardware components. The system is controlled by microprocessor 604, which serves as the central processing unit (CPU) for the system. System memory 612 is typically divided into multiple types of memory or memory areas such as read-only memory (ROM), random-access memory (RAM) and others. The system memory 612 can also contain a basic input/output system (BIOS). A plurality of general input/output (I/O) adapters or devices 608, 616, and 620 are present. Only three, namely I/O adapters or devices 608, 616, and 620, are shown for clarity. These connect to various devices including a fixed disk drive 628, network 224, a display 624, and other hardware components 632, such as a diskette drive, a camera or other image capture device, a keyboard, a microphone, a speaker, and the like. Computer program code instructions for implementing the functions disclosed herein can be stored in the disk drive 628. When the system is operating, the instructions are at least partially loaded into system memory 612 and executed by microprocessor 604. Optionally, one of the I/O devices is a network adapter or modem for connection to the network, which may be the Internet. It should be noted that the system of FIG. 6 is meant as an illustrative example only. Numerous types of general-purpose computer systems are available and can be used. When equipped with an image capturing device, a microphone and a speaker, the computer system may be used to implement a conference endpoint.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIVI926EJ-S™ processors, other industry-equivalent processors, and may perform computational functions using any known or future-developed standard, instruction set, libraries, and/or architecture.

Any of the steps, functions, and operations discussed herein can be performed continuously and automatically.

The exemplary systems and methods of this disclosure have been described in relation to a distributed processing network. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a server, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements.

These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

For example in one alternative embodiment, the system is applied to audio-only calls with no video capability.

In another alternative embodiment, the video analyzer 204 and/or line-of-sight detector 216 analyze still frames captured of the monitored area.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A communication system, comprising:
   a processor; and
   wherein the processor is configured to:

cause an electromagnetic emitter to irradiate a location on a selected object in proximity to a speaker;

determine, from radiation reflected by the selected object at the irradiated location, an audio characteristic of the irradiated location; and when the audio characteristic is acceptable, assigning an electromagnetic microphone to collect audio information from radiation reflected by the selected object at the irradiated location.

2. The system of claim 1, wherein the location is at least part of the selected object and wherein the processor causes the electromagnetic emitter to irradiate plural locations, determines a respective audio characteristic for each of the irradiated locations, compares the respective audio characteristics with one another, and assigns the electromagnetic microphone to the location having a superior respective audio characteristic for collection of audio information.

3. The system of claim 1, wherein the processor selects the location for the electromagnetic emitter to irradiate for audio information collection based on one or more of lip movement of a participant and gaze direction of a participant.

4. The system of claim 1, wherein the processor determines, during irradiation of the location, whether a line-of-sight between the electromagnetic emitter and the location is blocked and, when the line-of-sight is blocked, selects a different location for irradiation having line-of-sight with the electromagnetic emitter.

5. The system of claim 1, wherein the selected object is one or more of a wall, mirror, window, screen, picture, item of furniture, ceiling, vase, drinking utensil, window cover, and floor, wherein the radiation is one of light outside of the visible spectrum and microwave radiation, wherein the electromagnetic microphone comprises an electromagnetic emitter and a detector to detect reflected radiation, and wherein the processor controls the pan and tilt of the electromagnetic microphone to direct the electromagnetic microphone to the irradiated location to collect audio information.

6. The system of claim 1, wherein the electromagnetic microphone comprises an electromagnetic emitter and a detector to detect reflected radiation, wherein the electromagnetic emitter is part of the electromagnetic microphone, wherein the audio characteristic is a signal-to-noise ratio of a signal output by the detector describing a sound pressure wave contacting the irradiated location, and wherein the processor controls the pan and tilt of the electromagnetic microphone to direct the electromagnetic microphone to the location to irradiate the location to determine the audio characteristic.

7. The system of claim 1, wherein the electromagnetic emitter is separate from an electromagnetic emitter in the electromagnetic microphone, wherein the radiation emitted by the electromagnetic emitter has a wavelength different from a wavelength of the radiation output by the electromagnetic microphone, and wherein the audio characteristic is an irradiated spot size or radiation intensity at the location.

8. A communication system, comprising:
a processor;
plural electromagnetic microphones, each electromagnetic microphone comprising a radiation emitter and a radiation detector;
a media input to collect video of participants to a communication session during the communication session; and
wherein the processor is configured to:

cause an electromagnetic emitter to irradiate a location on a selected object in proximity to a speaker;

determine, from radiation reflected by the selected object at the irradiated location, an audio characteristic of the irradiated location; and when the audio characteristic is acceptable, assigning an electromagnetic microphone to collect audio information from radiation output by the electromagnetic microphone and reflected by the selected object at the irradiated location.

9. The system of claim 8, wherein the processor causes the electromagnetic emitter to irradiate plural locations, determines a respective audio characteristic for each of the irradiated locations, compares the determined respective audio characteristics with one another, and assigns the electromagnetic microphone to the location having a superior respective audio characteristic for collection of audio information.

10. The system of claim 8, wherein the location is at least part of the selected object and wherein the processor selects the location for the electromagnetic emitter to irradiate for audio information collection based on one or more of lip movement of a participant and gaze direction of a participant.

11. The system of claim 8, wherein the processor determines, during irradiation of the location, whether a line-of-sight between the electromagnetic emitter and the location is blocked and, when the line-of-sight is blocked, selects a different location for irradiation having line-of-sight with the electromagnetic emitter.

12. The system of claim 8, wherein the selected object is one or more of a wall, mirror, window, screen, picture, item of furniture, ceiling, vase, drinking utensil, window cover, and floor, wherein the radiation is one of light outside of the visible spectrum and microwave radiation, wherein the electromagnetic microphone comprises an electromagnetic emitter and a detector to detect reflected radiation, and wherein the processor controls the pan and tilt of the electromagnetic microphone to direct the electromagnetic microphone to the irradiated location to collect audio information.

13. The system of claim 8, wherein the electromagnetic microphone comprises an electromagnetic emitter and a detector to detect reflected radiation, wherein the electromagnetic emitter is part of the electromagnetic microphone, wherein the audio characteristic is a signal-to-noise ratio of a signal output by the detector describing a sound pressure wave contacting the irradiated location, and wherein the processor controls the pan and tilt of the electromagnetic microphone to direct the electromagnetic microphone to the location to irradiate the location to determine the respective audio characteristic.

14. The system of claim 8, wherein the electromagnetic emitter is separate from an electromagnetic emitter in the electromagnetic microphone, wherein the radiation emitted by the electromagnetic emitter has a wavelength the same as a wavelength of the radiation output by the electromagnetic microphone, and wherein the audio characteristic is an irradiated spot size or radiation intensity at the location.

15. In a video conference call system, a method comprising:
causing, by a processor, an electromagnetic emitter to irradiate a location on a selected object in proximity to a speaker;
determining, by the processor from radiation reflected by the selected object at the irradiated location, a respective audio characteristic of the irradiated location; and when the respective audio characteristic is acceptable, assigning, by the processor, an electromagnetic microphone to collect audio information from radiation reflected by the selected object at the irradiated location.

16. The method of claim 15, wherein the processor causes the electromagnetic emitter to irradiate plural locations, determines the respective audio characteristic for each of the irradiated locations, compares the respective audio characteristics with one another, and assigns the electromagnetic microphone to the location having a superior respective audio characteristic for collection of audio information.

17. The method of claim 15, further comprising:
selecting, by the processor, the location for the electromagnetic emitter to irradiate for audio information collection based on one or more of lip movement of a participant and gaze direction of a participant.

18. The method of claim 15, wherein the location is at least part of the selected object and further comprising:
determining, by the processor, during irradiation of the location, whether a line-of-sight between the electromagnetic emitter and the location is blocked; and
when the line-of-sight is blocked, selecting, by the processor, a different location for irradiation having line-of-sight with the electromagnetic emitter.

19. The method of claim 15, wherein the selected object is one or more of a wall, mirror, window, screen, picture, item of furniture, ceiling, vase, drinking utensil, window cover, and floor, wherein the radiation is one of light outside of the visible spectrum and microwave radiation, wherein the electromagnetic microphone comprises an electromagnetic emitter and a detector to detect reflected radiation, wherein the electromagnetic emitter is part of the electromagnetic microphone, wherein the processor controls the pan and tilt of the electromagnetic microphone to direct the electromagnetic microphone to the irradiated location to collect the audio characteristic and audio information, wherein the audio characteristic is a signal-to-noise ratio of a signal output by the detector describing a sound pressure wave contacting the irradiated location, and wherein the processor controls the pan and tilt of the electromagnetic microphone to direct the electromagnetic microphone to the location to irradiate the location to determine the audio characteristic.

20. The method of claim 15, wherein the selected object is one or more of a wall, mirror, window, screen, picture, item of furniture, ceiling, vase, drinking utensil, window cover, and floor, wherein the radiation is one of light outside of the visible spectrum and microwave radiation, wherein the electromagnetic emitter is separate from an electromagnetic emitter in the electromagnetic microphone, wherein the radiation emitted by the electromagnetic emitter has a wavelength different from a wavelength of the radiation output by the electromagnetic microphone, wherein the audio characteristic is an irradiated spot size or radiation intensity at the location, and wherein the processor controls the pan and tilt of the electromagnetic microphone to direct the electromagnetic microphone to the irradiated location to collect audio information.

21. A video conferencing system, comprising:
a processor;
a media input, coupled to the processor, to collect image information of one or more local participants to a communication session;
a media output, coupled to the processor, to provide, in a selected layout, image information of one or more remote participants to the communication session;
an audio output, coupled to the processor, to provide audio information from the one or more remote participants; and
an audio input, coupled to the processor, to collect audio information from the one or more local participants, wherein the audio input comprises an array of electromagnetic microphones, each electromagnetic microphone comprising an electromagnetic emitter to irradiate a location on a selected object in proximity to the one or more local participants and a detector to collect radiation reflected by the selected object at the irradiated location and wherein the processor determines the audio information from the reflected radiation collected by each electromagnetic microphone in the array.

* * * * *